United States Patent [19]

Jagoda et al.

[11] 3,909,821

[45] Sept. 30, 1975

[54] COMMUNICATING OVER POWER LINES

[75] Inventors: Neil H. Jagoda, Framingham; Klaus Kubierschky, North Reading; Howard S. Baker, Brockton, all of Mass.

[73] Assignee: General Public Utilities Corporation, New York, N.Y.

[22] Filed: Oct. 4, 1973

[21] Appl. No.: 403,512

[52] U.S. Cl. .......................... 340/310 R; 333/24 C

[51] Int. Cl.[2] .......................... H04M 11/04

[58] Field of Search ............ 340/310 R, 310 A, 150, 340/171

[56] References Cited

UNITED STATES PATENTS

| | | | |
|---|---|---|---|
| 2,001,450 | 5/1935 | Boddie | 340/310 A |
| 2,375,722 | 5/1945 | Woodworth | 340/310 R |
| 2,498,899 | 2/1950 | Saville | 340/310 R |
| 2,743,434 | 4/1956 | Fleming | 340/310 R |
| 3,223,889 | 12/1965 | Schweitzer | 340/310 A |
| 3,483,546 | 12/1969 | Ausfeld | 340/310 A |
| 3,656,112 | 4/1972 | Paull | 340/310 R |
| 3,714,451 | 1/1973 | Whitney et al. | 340/310 R |

*Primary Examiner*—Thomas B. Habecker
*Attorney, Agent, or Firm*—Charles Hieken; Jerry Cohen

[57] ABSTRACT

An audiofrequency signal is applied to a power amplifier having an output impedance of considerably less than an ohm that is coupled through a network comprising at least a capacitor that presents a low impedance to this audiofrequency signal and much higher impedance to energy at the 60 Hz power frequency to a power line to provide an amplified signal that is transmitted to a receiver separated from the transmitter by at least one distribution transformer and having a high pass filter for rejecting the 60 Hz power frequency and a number of harmonics thereof while transmitting the audiofrequency signal. The system is especially advantageous for using ordinary power lines for transmitting information in connection with automatic meter reading.

7 Claims, 7 Drawing Figures

COMMUNICATING OVER POWER LINES

BACKGROUND OF THE INVENTION

The present invention relates in general to communicating over power lines and more particularly concerns novel apparatus and techniques for communicating over power lines and through distribution transformers to facilitate economically viable automatic reading systems.

Utility meter reading is typically accomplished by a meter reader periodically reading and recording the meter reading at the location of each customer. When meters are inside a building and no one is available to admit the meter reader, the meter reading for that period is omitted. The meter reading may leave a postcard addressed to the utility instructing the customer to read the meter himself, write the reading on the postcard and mail the reading to the utility. Alternatively, the utility may estimate the use for that period based on past history. Both of these approaches are subject to inaccuracy. Moreover, even in systems where the meter is located outside and the meter reader always has access to it, manually obtaining readings and manually converting these readings for automatic processing is costly and time consuming.

Accordingly, a number of automatic meter reading systems have been proposed. One approach involves the use of telephone lines to carry the data. Another contemplates transceivers at each customer location with an aircraft flying over the area to interrogate transponders at each customer location through the transceivers. Still another approach contemplates the use of power lines for communicating data, but with costly links bypassing each distribution transformer. A disadvantage common to all these systems is high cost.

Accordingly, it is an important object of this invention to provide an improved power line communication system.

It is a further object of the invention to achieve the preceding object with a relatively economical communication system in which data are transmitted through distribution transformers.

It is a further object of the invention to achieve the preceding object with economical and reliable transmitters and receivers.

SUMMARY OF THE INVENTION

According to the invention, it has been discovered that it is possible and practical to transmit data over power lines and through distribution transformers without requiring extreme power levels. It has been discovered that information may be transmitted using audio-frequency signals, preferably of frequency high enough to be outside the frequency range of harmonics of power line frequencies of significant amplitude and low enough not to be overly attenuated when passing through the distribution transformer or other elements of the power line transmission system. An acceptable frequency range is between 1 kHz and 20 kHz, with the order of 5 kHz being a preferred choice. It has been found important to use a transmitter that presents a low source impedance of less than 4 ohms at the communication frequency of interest while not overly loading the power line by presenting a much higher impedance at power frequency. The receiving means according to the invention includes high pass filter means for passing the communication signal frequency while appreciably attenuating signals having spectral components below the communications signal frequency.

BRIEF DESCRIPTION OF THE DRAWING

Numerous other features, objects and advantages of the invention will become apparent from the following specification when read in connection with the accompanying drawing in which.

DETAILED DESCRIPTION OF PREFERRED EMBODIMENTS

Figures 1, 2, 3:
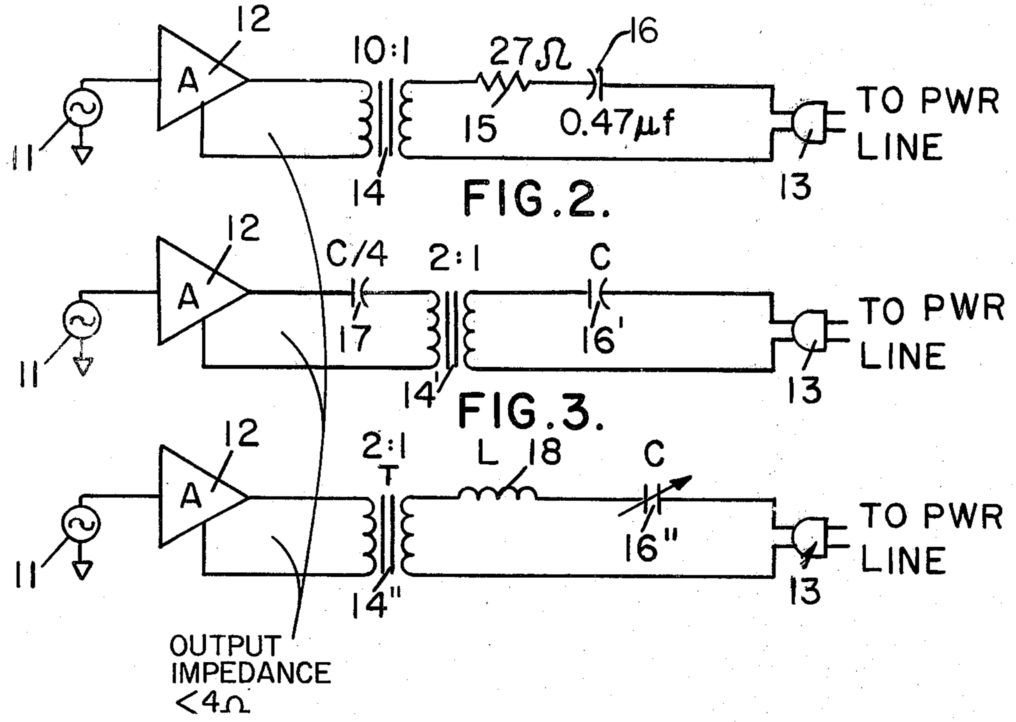
FIGS. 1–4 are schematic circuit diagrams of exemplary transmitters for communicating over a power line.

With reference now to the drawing and more particularly FIG. 1, there is shown a schematic circuit diagram of one embodiment of a transmitter according to the invention. An oscillator or other suitable tone signal source 11 energizes the input of a conventional audio amplifier 12 whose output is coupled to the power line through ordinary a-c plug 13, transformer 14, resistor 15 and capacitor 16 with relevant parameter values indicated. Transformer 14 presents at its secondary an impedance that is 0.01 the output impedance of amplifier 12. Thus, if amplifier 12 has an output impedance of 4 ohms, the impedance presented at secondary of transformer 14 is 0.04 ohms.

The 27 ohm resistor 15 and 0.47 microfarad capacitor 16 provide a relatively low impedance path for the signals of frequencies provided by source 11 while presenting a relatively high impedance to the power line. A Dynaco Model 120A high fidelity transistor power amplifier capable of delivering 60 watts into an 8-ohm load coupled power into the power line with the circuit of FIG. 1.

Referring to FIG. 2, there is shown another embodiment of the invention which more efficiently couples energy into the power line. Transformer 14′ has a primary-to-secondary turns ratio of 2:1. Capacitors 16′ and 17 are selected to resonate substantially with the primary inductances of transformer 14′ at the frequency of source 11 to couple more efficiently energy into the power line and present a relatively low output impedance to the power line at the frequency of source 11 and a much higher output impedance at the power frequency.

Referring to FIG. 3, there is shown still another embodiment of the invention in which capacitor 17 is eliminated, series inductor 18 is added on the line side of transformer 14′ and variable capacitor 16′′ is substituted for capacitor 16′. Capacitor 16′′ is tuned for peak signal current at the operating frequency provided by source 11. Air core inductor 18 develops enough of the voltage across it at resonance to prevent the core of transformer 14′ from being saturated. This keeps core losses relatively small and the coupling good. That embodiment of the invention produced over 15 volt-amperes of signal on the power line.

Figure 4:
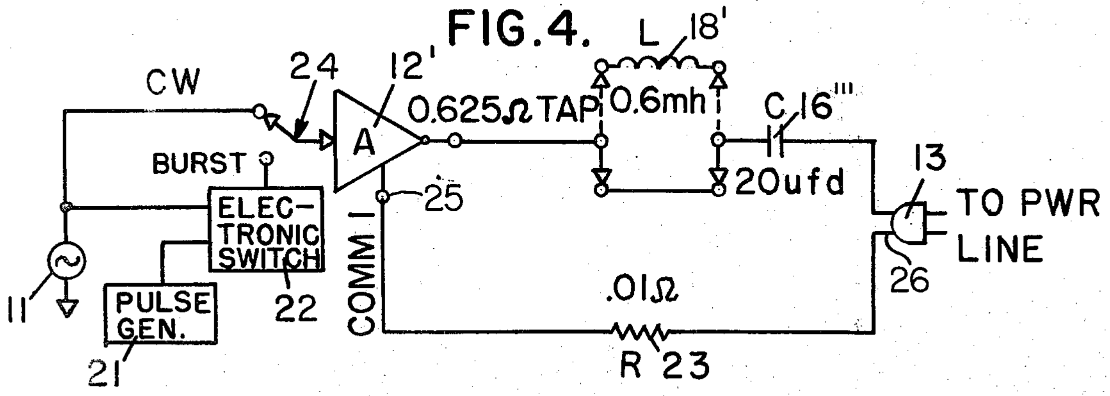

FIG. 4 shows a preferred embodiment of the invention in which amplifier 12' has a very low output impedance and is capable of deliverying 200 watts at 0.625 ohm when connected to the 0.625 ohm tap on amplifier 12'. Inductor 18' is connected in series between the output of amplifier 12' and capacitor 16''' when the frequency provided by source 11 is less than 2 kHz; for frequencies above 2 kHz, there is a direct connection between the output of amplifier 12' and capacitor 16''' where the reactance of the 20 μfd. capacitor 16''' is 3.9 ohms or less so that the magnitude of the impedance presented to the power line is less than 4 ohms at the frequency of source 11 and greater than 132 ohms at the 60 Hz powerline frequency. A current shunt 23 is connected in series between the common terminal 25 of amplifier 12' and the other power line 25 to develop a voltage representative of current delivered to the power line that may be conveniently measured. A pulse generator 21 actuates electronic switch 22 so that tone bursts are transmitted when the arm of switch 24 is connected to the output of electronic switch 22. Pulse generator 21 may represent a source of coded information to be transmitted carried by a suitable code in accordance with well known techniques.

The following table identifies the components in a specific embodiment of FIG. 3:

A: Dynaco, Model 120A
T: Core: Ferrox Cube 3622P-LOO-3E
  Bobbin: Ferrox Cube 3622-FID
  Primary (1–2): 50 turns, Awg 22
  Secondary (3–4): 25 turns, Awg 16
L: 108 turns of AWG 16 closely spaced on a 5.5 inch dia. phenolic coil form (Approximately 1 mh)
C: Variable. Tuned for peak signal current at the operating frequency The following table identifies specific components in an exemplary embodiment of FIG. 4:

A: Bogen No. NTB250, Booster Amplifier
L: 75 turns of AWG 14 wire closely spaced on a 5.5 dia. phenolic coil form (approx. 0.6 mh). This coil is to be used for frequencies below 2 kHz.
C: Commutation Capacitor (GE No. 28F1202)
R: Current shunt, 0.01 ohm (Weston No. 0042211)

Figures 5, 6, 7:
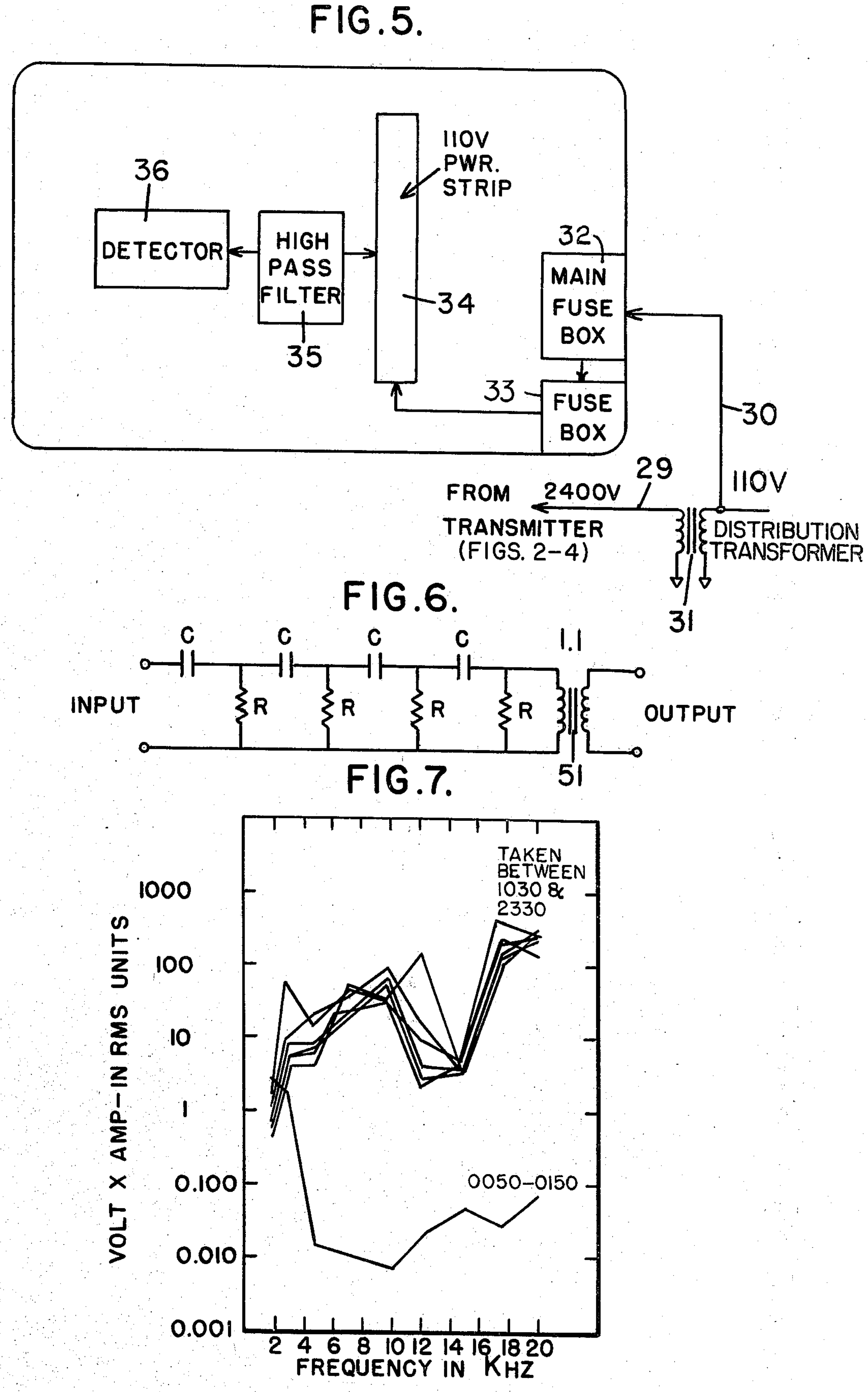
FIG. 5 is a block diagram illustrating the logical arrangement of a suitable receiver.
FIG. 6 is a schematic circuit diagram of a suitable high pass filter in an exemplary embodiment.
FIG. 7 grapically represents transmitter volt-amperes as a function of frequency to produce a signal level of 100 microvolts at the input of a receiver 9000 feet from the transmitter at various times of day.

FIG. 5 shows a block diagram illustrating the logical arrangement of a receiver coupled to a power line. The signal from the transmitter is carried by the 2400 volt line 29 and coupled through a step-down transformer 31 to the 110 volt line 30. The signal passes through main and auxiliary fuse boxes 32 and 33, respectively, to a 110 volt power strip 34 and through a high pass filter 35 to a detector 36. The detector 36 may comprise, for example, a spectrum analyzer or tone filter followe by a rectifier or other suitable circuit for discriminating between the presence and absence of a signal of the frequency provided by source 11.

FIG. 6 shows a schematic circuit diagram of a suitable high pass filter 36 comprising a four-section RC ladder network with C and R for each section typically being 0.01 microfarad and 10K ohm, respectively. Output transformer 51 functions as a line isolation transformer for safety. High pass filter 36 helps prevent overloading the detector circuitry which follows that might be caused by the 60 Hz power signal on the line and harmonics thereof.

It has been discovered that distribution transformers can transmit audio signal frequencies with meaningful information within the frequency range from 60 Hz to 20 kHz without excessive distortion or attenuation. An analysis of parameters which characterize a power transformer supports this conclusion. A power transformer is designed to transfer power optimally at the nominal power frequency of 60 Hz. A transformer may be characterized by an effective coupling capacity $C_c$ that bridges the transformer primary and secondary shunt capacities $C_p$, $C_s$, respectively, primary and secondary series leakage inductances $L_p$ and $L_s$, respectively, primary and secondary winding resistances $R_p$ and $R_s$, respectively, and an effective core loss resistance $R_c$. This core loss resistance effectively shunts the primary and secondary winding inductances. It has been discovered that there is an audiofrequency range in a distribution transformer within which the reactance presented by the shunt capacitances $C_p$ and $C_s$ is sufficiently high that audio signals in the primary side of the transformer reach the secondary side of the transformer. This happens because the signals in the primary side produce magnetizing current in the primary winding that is coupled to the secondary winding either inductively or through the bridging capacitance $C_c$, or in both ways. If the audiofrequency is too high, the effective impedance presented by the shunt capacitances $C_p$ and $C_s$ effectively short-circuits the input to the transformer and presents an appreciable signal from passing through the transformer. Moreover, the capacity between the power lines helps bypass high-frequency energy.

It has been discovered through a research program including field tests that practical communications may be established in accordance with the principles of the invention over a distance of 9000 feet over a frequency range of 2 kHz to 20 kHz, the optimum frequency being of the order of 5 kHz.

FIG. 7 is a graphical representation on a logarithmic scale, of an experimental determination of volt-amperes required at the transmitter as a function of frequency to produce a receiver signal of 100 microvolts at a receiver 9000 feet away. Considerably less power is required if the communications occur in the early morning hours after midnight. According to one aspect of the invention, communications are established over power lines in the early morning hours when use of power is at a minimum. The reduced power requirement results from a number of reasons. First, the reduced load on the power lines after midnight results in a higher power line impedance, so that a given current produces a higher voltage across the line. Second, many power substations have power-correction capacitors that are removed from the power lines during the early morning hours when less power is being used and less power factor correction is required. This capacitor removal also helps to raise the power line impedance.

It has also been discovered that the communication signal frequency should be as low as practical to lessen the effects of changes in consumer load while being high enough to be above the range of significant harmonics of the 60 Hz power line frequency.

Attenuation is also a function of transformer leakage inductance. Therefore, it is desirable that the distribution transformers have as low a leakage inductance as practical. The newer sheet-wound distribution transformers have lower leakage inductances and introduce less attenuation. It is also preferred that an unloaded transformer be used at the substation for monitoring signals being returned from customer locations to reduce the effect of consumer load variations at least as to what transformer.

It has been discovered as a result of empirical test data that the communications signal frequency should be in the range between 1 kHz and 20 kHz, 3 kHz to 8 kHz being the preferred band and 5 kHz being an optimum choice.

It is also preferred that the transmission rate to 60 bits per second or less to keep receiver filtering requirements down while allowing the use of a relatively low signal-to-noise ratio. That rate is sufficient to enable a single central station controller to interrogate up to 3,600 meters per hour with a 60-bit interrogation cycle.

There have been described novel apparatus and techniques for communicating over power lines and through distribution transformers economically and reliably. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for communicating over power lines carrying power at power frequency comprising, a source of an audiofrequency signal within a predetermined frequency range within the frequency range of 1 kHz to 20 kHz, power amplifying means having a low output impedance coupled to said signal source for amplifying said audiofrequency signal, output terminal pair means for connection to a power line, and means for coupling said output terminal pair means to said amplifying means, said means for coupling having an output impedance presented to said output terminal pair means within the range of 0.1 to 4 ohms within said predetermined frequency range and a much higher impedance at said power frequency.

2. Apparatus for communicating over power lines in accordance with claim 1 wherein said output impedance presented to said power line is substantially less than 2 ohms at the frequency of the signal provided by said source.

3. Apparatus for communicating over power lines in accordance with claim 1 wherein said means for coupling comprises an inducator in series with a capacitor forming a circuit exhibiting series resonance substantially at the frequency of said audio-frequency signal.

4. Apparatus for communicating over power lines in accordance with claim 1 and further comprising first and second power lines carrying power at power frequency connected to said output terminal pair means.

5. Apparatus for communicating over power lines in accordance with claim 4 and further comprising, detecting means coupled to remote power lines at a remote point for detecting the signal provided by said power amplifying means, and at least one power distribution transformer intercoupling said remote power lines with said first and second power lines for transmitting through said transformer the amplified signal provided by said power amplifying means.

6. Apparatus for communicating over power lines in accordance with claim 1 wherein the frequency of said audiofrequency signal is within the range of 3 kHz to 8 kHz.

7. Apparatus for communicating over power lines in accordance with claim 6 wherein the frequency of said audiofrequency signal is substantially 5 kHz.

* * * * *